United States Patent
Hung et al.

(10) Patent No.: US 9,955,416 B1
(45) Date of Patent: Apr. 24, 2018

(54) WIRELESS COMMUNICATION METHOD AND WIRELESS COMMUNICATION SYSTEM

(71) Applicants: NATIONAL TAIWAN UNIVERSITY, Taipei (TW); MEDIATEK INC., Hsinchu (TW)

(72) Inventors: Shao-Chou Hung, Taipei (TW); Kwang-Cheng Chen, Taipei (TW)

(73) Assignees: NATIONAL TAIWAN UNIVERSITY, Taipei (TW); MEDIATEK INC., Hsinchu (TW)

( * ) Notice: Subject to any disclaimer, the term of this patent is extended or adjusted under 35 U.S.C. 154(b) by 0 days.

(21) Appl. No.: 15/672,323

(22) Filed: Aug. 9, 2017

(30) Foreign Application Priority Data

Mar. 21, 2017 (TW) .............................. 106109388 A

(51) Int. Cl.
| | |
|---|---|
| *H04B 7/00* | (2006.01) |
| *H04W 48/16* | (2009.01) |
| *H04W 48/20* | (2009.01) |
| *H04W 24/02* | (2009.01) |
| *H04W 72/04* | (2009.01) |
| *H04W 88/08* | (2009.01) |
| *H04W 76/02* | (2009.01) |

(52) U.S. Cl.
CPC .......... *H04W 48/20* (2013.01); *H04W 24/02* (2013.01); *H04W 72/0406* (2013.01); *H04W 76/02* (2013.01); *H04W 76/10* (2018.02); *H04W 88/08* (2013.01)

(58) Field of Classification Search
CPC ..... H04W 48/16; H04W 48/20; H04W 84/12; H04B 7/00
USPC .................................. 455/525; 370/328, 908
See application file for complete search history.

(56) References Cited

U.S. PATENT DOCUMENTS

| | | | | |
|---|---|---|---|---|
| 7,664,129 | B2 * | 2/2010 | Takagi ............. | H04W 74/0816 370/437 |
| 9,439,067 | B2 * | 9/2016 | Cherian ................ | H04L 9/0869 |
| 9,699,714 | B2 * | 7/2017 | Luo ....................... | H04W 48/16 |
| 2017/0353914 | A1 * | 12/2017 | Jung ..................... | H04W 48/16 |
| 2017/0353989 | A1 * | 12/2017 | Kim ...................... | H04L 5/0053 |

* cited by examiner

*Primary Examiner* — Quochien B Vuong
(74) *Attorney, Agent, or Firm* — CKC & Partners Co., Ltd.

(57) ABSTRACT

The disclosure provides a method including the following steps: receiving, by an electronic device, beacon signals transmitted from access points, and estimating the number of the access points according to the beacon signals; determining by the electronic device whether the electronic device can connect to a base station; when it is determined that the electronic device cannot connect to the base station, estimating the number of connection access points according to the number of the access points and a first data queue by the electronic device; and when it is determined that the electronic device can connect to the base station, determining by the electronic device whether to connect the electronic device to the base station according to the first data queue, and estimating the number of the connection access points according to the number of the access points, the first data queue and a determination result.

14 Claims, 3 Drawing Sheets

WIRELESS COMMUNICATION METHOD AND WIRELESS COMMUNICATION SYSTEM

RELATED APPLICATION

This application claims priority to Taiwan Application Serial Number 106109388, filed Mar. 21, 2017, which is herein incorporated by reference.

BACKGROUND

Field of Invention

Present disclosure relates to a communication method and a communication system. More particularly, present disclosure relates to a wireless communication method and a wireless communication system.

Description of Related Art

Wireless communication technology is applied to many electronic devices in many fields around people and grows rapidly, from sports, household, healthcare to traffic. However, currently, the wireless communication technology applied to the electronic device still focuses on homogeneous network coordination (such as handoff between different base stations), and the coordination in a heterogeneous network (such as data transmission between base station and wireless access points) is not considered. As a result, services and user experience relied upon these electronic devices may be substantially limited by current network architecture.

Therefore, it is a challenge for people in the art to build an effective coordination mechanism in the heterogeneous network to improve the services and user experience relied upon these electronic devices.

SUMMARY

An aspect of the disclosure relates to a wireless communication method applied to a wireless communication system, and the wireless communication system includes a base station and multiple access points. The wireless communication method includes the following steps: receiving beacon signals transmitted from the access points by an electronic device, and estimating the number of the access points according to the beacon signals by the electronic device; determining whether the electronic device is able to connect to the base station by the electronic device; when it is determined that the electronic device is unable to connect to the base station, estimating the number of connection access points according to the number of the access points and a first data queue by the electronic device, and transmitting the number of the connection access points to a base band unit by the electronic device; and when it is determined that the electronic device is able to connect to the base station, determining by the electronic device whether to connect the electronic device to the base station according to the first data queue, estimating by the electronic device the number of the connection access points according to the number of the access points, the first data queue and a determination result, and transmitting the determination result and the number of the connection access points to the base band unit by the electronic device.

Another aspect of the disclosure relates to a wireless communication system, and the wireless communication system includes a base station and multiple access points. The access points are configured for transmitting beacon signals to an electronic device. The electronic device is configured for estimating the number of the access points according to the beacon signals, and determining whether the electronic device is able to connect to the base station. When it is determined that the electronic device is unable to connect to the base station, the electronic device is configured for estimating the number of connection access points according to the number of the access points and the first data queue, and transmitting the number of the connection access points to a base band unit; when it is determined that the electronic device is able to connect to the base station, the electronic device is configured for determining whether to connect the electronic device to the base station according to the first data queue, estimating the number of the connection access points according to the number of the access points, the first data queue and a determination result, and transmitting the determination result and the number of the connection access points to the base band unit.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
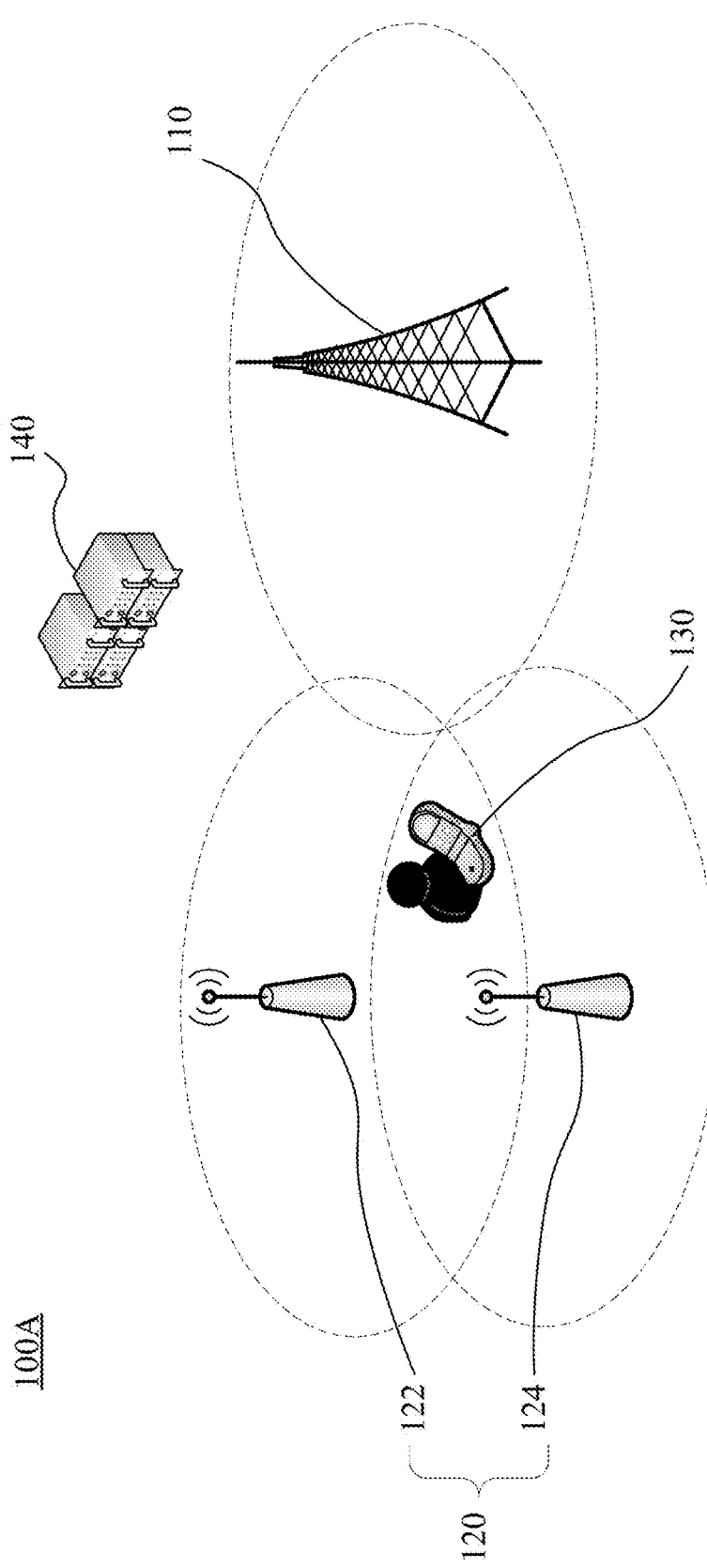
FIGS. 1A and 1B are schematic diagrams of a wireless communication system according to some embodiments of present disclosure.

Reference will now be made in detail to the present embodiments of the disclosure, examples of which are illustrated in the accompanying drawings. Wherever possible, the same reference numbers are used in the drawings and the description to refer to the same or like parts.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," and the like are to be understood to be open-ended, i.e., to mean including but not limited to.

FIG. 1A is a schematic diagram of a wireless communication system drawn according to some embodiments of present disclosure. As shown in FIG. 1A, a wireless communication system 100A includes a base station 110 and multiple access points 120 (in the embodiment, the access points 120 include a first access point 122 and a second access point 124). The access points are configured for transmitting beacon signals to an electronic device 130. The electronic device 130 is configured for estimating the number of the access points 120 according to the beacon signals being transmitted. The electronic device 130 is further configured to determine whether the electronic device 130 can be connected to the base station 110.

In an embodiment, when it is determined that the electronic device 130 cannot be connected to the base station 110, the electronic device 130 is used for estimating the number of connection access points according to the number of the access points 120 and a first data queue. The electronic device 130 then transmits the number of the connection access points to a base band unit 140. In another embodiment, when it is determined that the electronic device 130 can be connected to the base station 110, the electronic device 130 is used for determining whether to connect the electronic device 130 to the base station 110 according to the first data queue. The electronic device 130 estimates the number of the connection access points according to the number of the access points 120, the first data queue and a determination result. The electronic device 130 then transmits the determination result and the number of the connection access points to the base band unit 140.

Figure 1B:
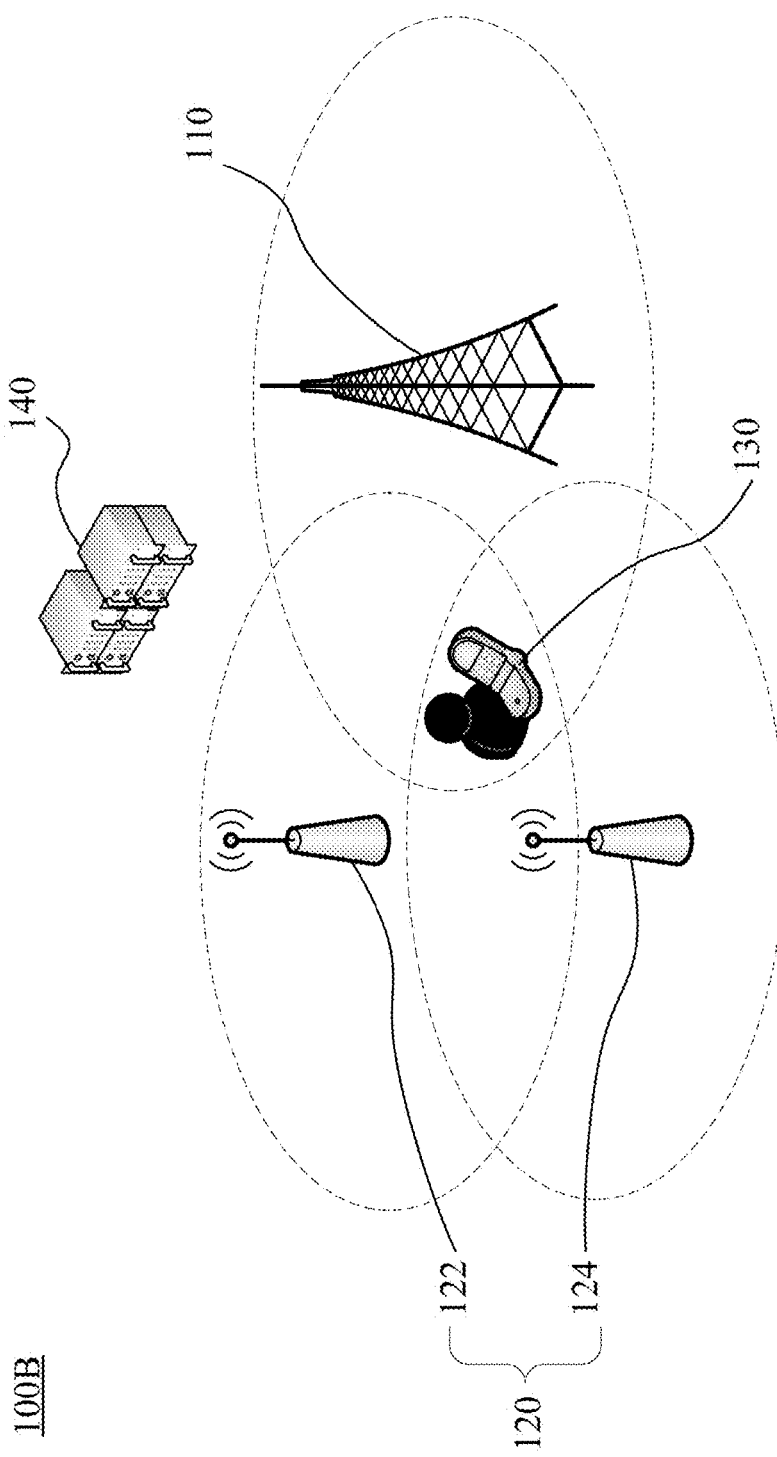

For example, as shown in FIG. 1A, the electronic device 130 is located in an effective coverage area of the first access point 122 and an effective coverage area of the second access point 124 simultaneously, but the electronic device 130 is located outside an effective coverage area corresponding to the base station 110. Therefore, the electronic device 130 can select to connect to the first access point 122 or the second access point 124 for data transmission, but the electronic device 130 cannot connect to the base station 110 (which means the electronic device 130 and the base station 110 is unable to transmit or receive data with each other currently). Moreover, reference is made to FIG. 1B. FIG. 1B is a schematic diagram of a wireless communication system according to some embodiments of the disclosure. As shown in FIG. 1B, a wireless communication system 100B includes a base station 110 and multiple access points 120 (in the embodiment, the access points 120 include a first access point 122 and a second access point 124). The electronic device 130 is located in effective coverage areas corresponding to the first access point 122, the second access point 124 and the base station 110 at the same time, and thus the electronic device 130 may select to connect to the first access point 122, the second access point 124 or the base station 110 to transmit or receive data.

In an embodiment, the first access point 122 is configured to transmit first beacon signals to the electronic device 130, and the second access point 124 is configured to transmit second beacon signals to the electronic device 130. When the electronic device 130 is located in the effective coverage area of the first access point 122 and the effective coverage area of the second access point 124 at the same time, the electronic device 130 may identify the first access point 122 and the second access point 124 according to the first beacon signals and the second beacon signals respectively. Therefore, the electronic device 130 may estimate the number of the access points 120 (herein refer to the first access point 122 and the second access point 124) according to the first beacon signals and the second beacon signals. In another embodiment, the electronic device 130 may estimate the number of the connection access points according to the number of the access points 120 and the size of the first data queue (in this embodiment, the size of the first data queue may refer to the data quantity to be processed in the electronic device 130), and the number of the connection access points corresponds to the value of the first data queue. For example, when the data quantity to be processed in the electronic device 130 is increased, the number of the connection access points may be added accordingly, and thus the electronic device 130 may connect to more access points 120 to accelerate data processing; when the data quantity to be processed in the electronic device 130 is reduced, the number of the connection access points may be reduced accordingly, and thus the electronic device 130 may connect to fewer access points 120 to reduce power consumption of the electronic device 130 and save bandwidth resources of the access points 120. It should be understood that the aforementioned first access point 122 and the second access point 124 are merely used to demonstrate a feasible configuration of the access points 120, rather than limiting the disclosure. For example, the number and the location configuration of the access points 120 are subject to change according to the demands in some embodiments.

In an embodiment, when the base band unit 140 receives the number of the connection access points, the base band unit 140 is configured to distribute target access points to the electronic device 130, wherein the target access points are selected from the access points 120. For example, referring to FIG. 1A, when the number of the connection access points is 1, the base band unit 140 may select to distribute the first access point 122 or the second access point 124 to the electronic device 130, and thus the electronic device 130 may be connected with the first access point 122 or the second access point 124 to transmit and receive data; when the number of the connection access points is 2, the base band unit 140 may distribute both of the first access point 122 and the second access point 124 to the electronic device 130 simultaneously, and thus the electronic device 130 may be connected to the first access point 122 and the second access point 124 at the same time for data transmission. It should be understood that the aforementioned embodiments are used to demonstrate feasible implementation of the base band unit 140 and feasible configurations of the access points 120 but not to limit the scope of present disclosure. In some embodiments, the base band unit 140 may be arranged in the base station 110 to collaborate with the base station 110, or may be arranged outside the base station 110 to operate independently (as shown in FIGS. 1A and 1B).

In another embodiment, when it is determined that the electronic device 130 is unable to connect to the base station 110, the electronic device 130 is configured for estimating the number of the connection access points according to the number of the access points 120, the first data queue and a first algorithm. In this embodiment, the first algorithm may be expressed as:

$$n(t) = \begin{cases} \min(D_t), & \text{if } \left\lceil \dfrac{\ln\dfrac{V}{2U(t)p}}{\ln(1-p)} \right\rceil < \min(D_t); \\ \left\lceil \dfrac{\ln\dfrac{V}{2U(t)p}}{\ln(1-p)} \right\rceil, & \text{if } \left\lceil \dfrac{\ln\dfrac{V}{2U(t)p}}{\ln(1-p)} \right\rceil \in D_t; \\ \max(D_t), & \text{if } \left\lceil \dfrac{\ln\dfrac{V}{2U(t)p}}{\ln(1-p)} \right\rceil > \max(D_t). \end{cases}$$

In the first algorithm, $D_t$ may refer to the available number set of the access points 120 at the time t; $n(t)$ may refer to the number of connection access points at the time t; $U(t)$ may refer to the value of the first data queue at the time t; p may refer to a first preset constant; and V may refer to a second preset constant. For example, the first preset constant p may refer to a non-outage probability; the second preset constant V may refer to a constant corresponding to the number of the access points 120 (in this embodiment, when the second preset constant V is larger, it represents that the number of the access points 120 is larger; and when the second preset constant V is smaller, it represents that the number of the access points 120 is smaller.). In some embodiments, the base band unit 140 may transmit the first preset constant p and the second preset constant V to the electronic device 130 through the base station 110 or the access points 120, and thus the electronic device 130 may execute the first algorithm to estimate the number of connection access points.

In an embodiment, when the base band unit 140 receives the determination result and the number of the connection access points and determines to connect the electronic device 130 to the base station 110, the base band unit 140 is configured for distributing the base station 110 and target access points from the access points 120 to the electronic device 130 according to the determination result and the number of the connection access points; when the base band unit 140 receives the determination result and the number of the connection access points and determines not to connect the electronic device 130 to the base station 110, the base band unit 140 is configured for distributing target access points from the access points 120 to the electronic device 130 according to the determination result and the number of the connection access points. For example, referring to FIG. 1B, when it is determined to connect the electronic device 130 to the base station 110, the base band unit 140 may distribute the base station 110 to the electronic device 130, and thus the electronic device 130 may be connected with the base station 110 to transmit and receive data. It should be understood that the aforementioned embodiments are used to demonstrate feasible implementation of the base band unit 140 but not to limit the scope of present disclosure. The feasible configuration of the access points 120 distribution has been demonstrated in detail through the foregoing embodiments, and thus the configuration is not repeated herein. In some embodiments, the base band unit 140 may be arranged in the base station 110 to collaborate with the base station 110, or may be arranged outside the base station 110 to operate independently.

In another embodiment, when it is determined that the electronic device 130 can be connected to the base station 110 and it is determined to connect the electronic device 130 to the base station 110, the electronic device 130 is configured for being connected with the base station 110 to generate a second data queue, and estimating the number of the connection access points according to the number of the access points 120, the second data queue and a second algorithm; when it is determined that the electronic device 130 can be connected to the base station 110 and it is determined not to connect the electronic device 130 to the base station 110, the electronic device 130 is configured for estimating the number of the connection access points according to the number of the access points 120, the first data queue and the second algorithm. In this embodiment, the second algorithm may be expressed as:

$$n(t) = \begin{cases} \min(D_t), & \text{if } \left\lceil \frac{\ln \frac{X(t)}{U(t)}}{\ln(1-p)} \right\rceil < \min(D_t); \\ \left\lceil \frac{\ln \frac{X(t)}{U(t)}}{\ln(1-p)} \right\rceil, & \text{if } \left\lceil \frac{\ln \frac{X(t)}{U(t)}}{\ln(1-p)} \right\rceil \in D_t; \\ \max(D_t), & \text{if } \left\lceil \frac{\ln \frac{X(t)}{U(t)}}{\ln(1-p)} \right\rceil > \max(D_t). \end{cases}$$

In the second algorithm, $D_t$ may refer to the available number set of the access points 120 at the time t; n(t) may refer to the number of connection access points at the time t; U(t) may refer to the value of the first data queue or the second data queue at the time t; X(t) may refer to a time variable at the time t; and p may refer to a first preset constant. For example, the first preset constant p may refer to a non-outage probability; the time variable at the time t may be calculated iteratively according to the following relational expression: $X(t)=X(t)-N_{av}+n(t)$, and $N_{av}$ and $X(0)$ may refer to some preset constants (in this embodiment, $N_{av}$ may refer to an average number of the preset access points 120). In some embodiments, when the electronic device 130 can connect to the base station 110, the electronic device 130 may determine whether to connect the electronic device 130 to the base station 110 according to the value of the first data queue and a preset threshold. For example, when the value of the first data queue is larger than the preset threshold, it is determined that the electronic device 130 may connect to the base station 110 to accelerate data processing, and thus the second data queue is generated (in this embodiment, the electronic device 130 may connected to the base station 110 to reduce the value of the first data queue to the preset threshold, and thus the second data queue may refer to the value corresponding to the preset threshold). It should be understood that the aforementioned embodiments are used to demonstrate a feasible configuration for expressing the second data queue but not to limit the scope of present disclosure. For example, the second data queue may be a value larger or smaller than the preset threshold. In some embodiments, the base band unit 140 may transmit the first preset constant p to the electronic device 130 through the base station 110 or the access points 120, and thus the electronic device 130 may execute the second algorithm to estimate the number of the connection access points.

Figure 2:
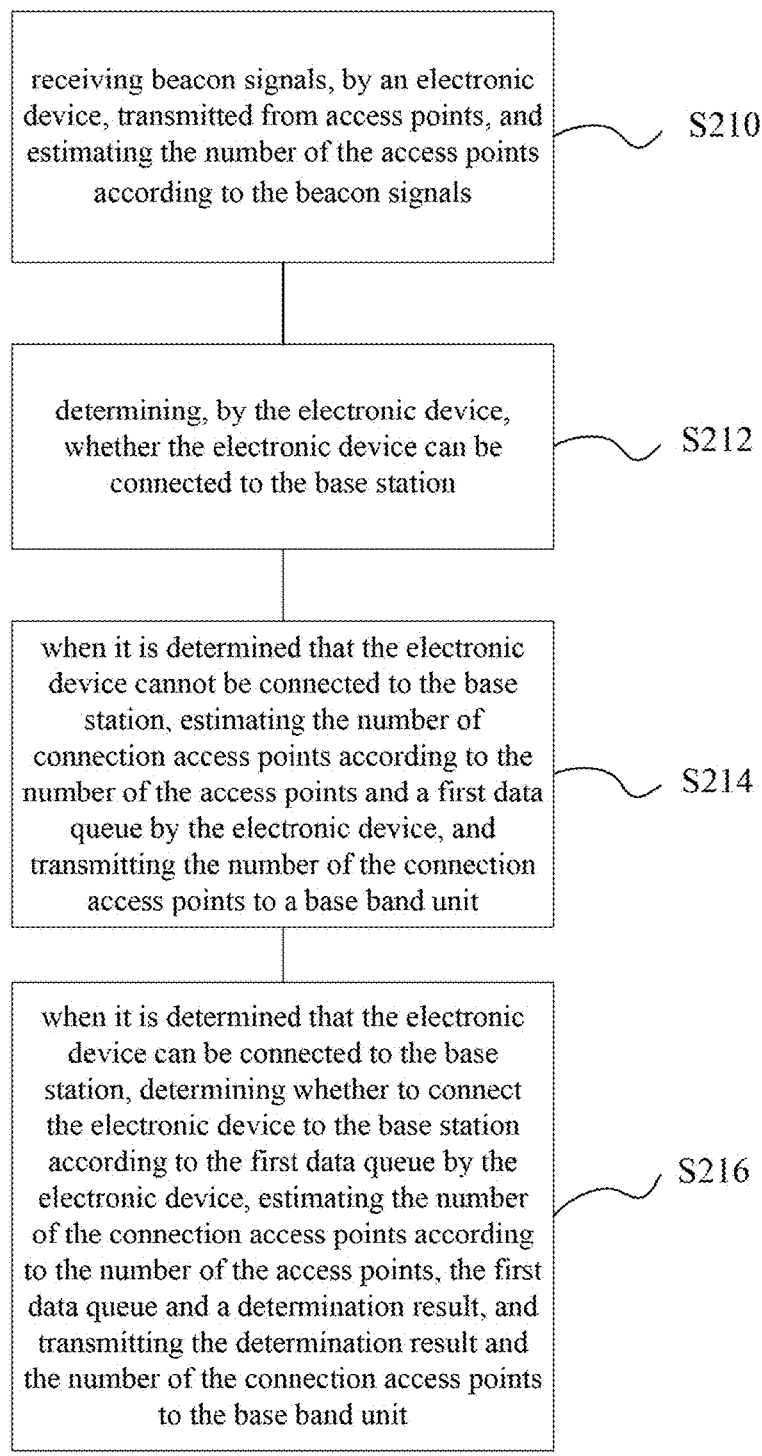
FIG. 2 is a flow chart of a wireless communication method according to some embodiments of present disclosure.

FIG. 2 is a flow chart of a wireless communication method according to some embodiments of present disclosure. In an embodiment, the wireless communication method 200 may be applied to aforementioned wireless communication system 100A or the wireless communication system 100B. As shown in FIG. 2, the wireless communication method 200 includes the following steps:

S210: receiving beacon signals, by an electronic device 130, transmitted from access points 120, and estimating the number of the access points 120 according to the beacon signals;

S212: determining, by the electronic device 130, whether the electronic device 130 can be connected to the base station 110;

S214: when it is determined that the electronic device 130 cannot be connected to the base station 110, estimating the number of connection access points according to the number of the access points 120 and a first data queue by the electronic device 130, and transmitting the number of the connection access points to a base band unit 140; and S216: when it is determined that the electronic device 130 can be connected to the base station 110, determining whether to connect the electronic device 130 to the base station 110 according to the first data queue by the electronic device 130, estimating the number of the connection access points according to the number of the access points 120, the first data queue and a determination result, and transmitting the determination result and the number of the connection access points to the base band unit 140.

In an embodiment, the first access point 122 and the second access point 124 are configured for transmitting first beacon signals and second beacon signals to the electronic device 130 respectively. When the electronic device 130 is located in effective coverage areas corresponding to the first access point 122 and the second access point 124 simultaneously, the wireless communication method 200 may be executed by the electronic device 130 to identify the first access point 122 and the second access point 124 according to the first beacon signals and the second beacon signals respectively. As such, the number of the access points 120 (the first access point 122 and the second access point 124) may be estimated. In another embodiment, the wireless communication method 200 may be executed by the electronic device 130 to estimate the number of the connection access points according to the number of the access points 120 and the value of the first data queue (in this embodiment, the value of the first data queue may refer to the data quantity to be processed in the electronic device 130), and the number of the connection access points corresponds to the value of the first data queue. The feasible implementation of the number of the connection access points has been demonstrated in detail through the foregoing embodiments, and thus the feasible implementation is not repeated herein.

In an embodiment, when the base band unit 140 receives the number of the connection access points, the wireless communication method 200 may be executed by the base band unit 140 to distribute target access points in the access points 120 to the electronic device 130 according to the number of the connection access points. Feasible implementation of the base band unit 140 and feasible configurations for distributing the access points 120 have been demonstrated in detail through the preceding embodiments, and thus they are no repeated herein. In another embodiment, referring to Step S214 and FIG. 1A, when it is determined that the electronic device 130 cannot be connected to the base station 110, the wireless communication method 200 may be executed by the electronic device 130 to estimate the number of the connection access points according to the number of the access points 120, the first data queue and the first algorithm. Feasible implementation of the first algorithm has been demonstrated in detail through the foregoing embodiments, and thus the feasible implementation is not repeated herein.

In an embodiment, when the base band unit 140 receives the determination result and the number of the connection access points and determines to connect the electronic device 130 to the base station 110, the wireless communication method 200 may be executed by the base band unit 140 to distribute the base station 110 and the target access points from the access points 120 to the electronic device 130 according to the determination result and the number of the connection access points; when the base band unit 140 receives the determination result and the number of the connection access points and determines not to connect the electronic device 130 to the base station 110, the wireless communication method 200 may be executed by the base band unit 140 to distribute the target access points from the access points 120 to the electronic device 130 according to the determination result and the number of the connection access points. Feasible implementation of the base band unit 140, feasible configurations for distributing the base station 110 and feasible configurations for distributing the access points 120 have been demonstrated in detail through the foregoing embodiments, and thus they are not repeated herein.

In another embodiment, referring to Step S216 and FIG. 1B, when it is determined that the electronic device 130 can be connected to the base station 110, the wireless communication method 200 may be executed by connecting the electronic device 130 to the base station 110 to generate a second data queue and estimating the number of the connection access points according to the number of the access points 120, the second data queue and the second algorithm; when it is determined not to connect the electronic device 130 to the base station 110, the wireless communication method 200 may be executed by the electronic device 130 to estimate the number of the connection access points according to the number of the access points 120, the first data queue and the second algorithm. Feasible implementation of the second algorithm has been demonstrated in detail through the foregoing embodiments, and thus the feasible implementation is not repeated here.

In some embodiments, when the electronic device 130 can be connected to the base station 110, the wireless communication method 200 may be executed via the electronic device 130 to determine whether to connect the electronic device 130 to the base station 110 according to the value of the first data queue and the preset threshold. For example, when the value of the first data queue is larger than the preset threshold, it is determined that the electronic device 130 may connect to the base station 110 to accelerate data processing, and thus the second data queue is generated (in this embodiment, the electronic device 130 may connect to the base station 110 to reduce the value of the first data queue to the preset threshold, and thus the second data queue may refer to the value corresponding to the preset threshold). It should be understood that the aforementioned embodiments are used to demonstrate a feasible configuration for expressing the second data queue but not to limit the scope of present disclosure. For example, the second data queue may be a value larger or smaller than the preset threshold.

In the aforementioned embodiments, according to the wireless communication method and the wireless communication system of present disclosure, the number of the connection access points is estimated by the electronic device according to a connecting status between the electronic device and the base station and the number of the access points, and thus the base band unit may select to distribute the base station and the access points according to the connecting status between the electronic device and the base station and the number of the connection access points. Therefore the connections for data transmission are built. Thus, an effective coordination mechanism may be established to the heterogeneous network for improving services and user experience of the wireless communication technology (such as improve speed of data transmission, make data transmission more stable, and reduces time delays).

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wireless communication method applied to a wireless communication system, wherein the wireless communication system comprises a base station and a plurality of access points, and the wireless communication method comprises:
   receiving, by an electronic device, beacon signals transmitted from the access points, and estimating a number of the access points according to the beacon signals;
   determining, by the electronic device, whether the electronic device is able to connect to the base station;
   when it is determined that the electronic device is unable to connect to the base station, estimating a number of connection access points according to the number of the access points and a first data queue by the electronic device, and transmitting the number of the connection access points to a base band unit; and when it is determined that the electronic device is able to connect to the base station, determining whether to connect the electronic device to the base station according to the first data queue by the electronic device, estimating the number of the connection access points according to the number of the access points, the first data queue and a determination result, and transmitting the determination result and the number of the connection access points to the base band unit.

2. The wireless communication method of claim 1, wherein when receiving the number of the connection access points, the base band unit distributes target access points from the access points to the electronic device according to the number of the connection access points.

3. The wireless communication method of claim 2, wherein when it is determined that the electronic device is unable to connect to the base station, estimating the number of the connection access points according to the number of the access points and the first data queue by the electronic device comprises:

estimating, by the electronic device, the number of the connection access points according to the number of the access points, the first data queue and a first algorithm, wherein the first algorithm is:

$$n(t) = \begin{cases} \min(D_t), & \text{if } \left\lceil \dfrac{\ln \dfrac{V}{2U(t)p}}{\ln(1-p)} \right\rceil < \min(D_t); \\ \left\lceil \dfrac{\ln \dfrac{V}{2U(t)p}}{\ln(1-p)} \right\rceil, & \text{if } \left\lceil \dfrac{\ln \dfrac{V}{2U(t)p}}{\ln(1-p)} \right\rceil \in D_t; \\ \max(D_t), & \text{if } \left\lceil \dfrac{\ln \dfrac{V}{2U(t)p}}{\ln(1-p)} \right\rceil > \max(D_t); \end{cases}$$

wherein $D_t$ is the available number set of the access points at the time t; n(t) is the number of the connection access points at the time t; U(t) is the value of the first data queue at the time t; p is a first preset constant; and V is a second preset constant.

4. The wireless communication method of claim 1, wherein when it is determined that the electronic device is unable to connect to the base station, estimating the number of the connection access points according to the number of the access points and the first data queue by the electronic device comprises:

estimating, by the electronic device, the number of the connection access points according to the number of the access points, the first data queue and a first algorithm, wherein the first algorithm is:

$$n(t) = \begin{cases} \min(D_t), & \text{if } \left\lceil \dfrac{\ln \dfrac{V}{2U(t)p}}{\ln(1-p)} \right\rceil < \min(D_t); \\ \left\lceil \dfrac{\ln \dfrac{V}{2U(t)p}}{\ln(1-p)} \right\rceil, & \text{if } \left\lceil \dfrac{\ln \dfrac{V}{2U(t)p}}{\ln(1-p)} \right\rceil \in D_t; \\ \max(D_t), & \text{if } \left\lceil \dfrac{\ln \dfrac{V}{2U(t)p}}{\ln(1-p)} \right\rceil > \max(D_t); \end{cases}$$

wherein $D_t$ is the available number set of the access points at the time t; n(t) is the number of the connection access points at the time t; U(t) is the value of the first data queue at the time t; p is a first preset constant; and V is a second preset constant.

5. The wireless communication method of claim 1, wherein when the base band unit receives the determination result and the number of the connection access points and determines to connect the electronic device to the base station, the base band unit distributes the base station and target access points from the access points to the electronic device according to the determination result and the number of the connection access points; when the base band unit receives the determination result and the number of the connection access points and determines not to connect the electronic device to the base station, the base band unit distributes target access points from the access points to the electronic device according to the determination result and the number of the connection access points.

6. The wireless communication method of claim 5, wherein when it is determined that the electronic device is able to connect to the base station, estimating the number of the connection access points according to the number of the access points and the determination result comprises:

when it is determined to connect the electronic device to the base station, connecting the base station by the electronic device to generate a second data queue, and estimating the number of the connection access points according to the number of the access points, the second data queue and a second algorithm;

when it is determined not to connect the electronic device to the base station, estimating, by the electronic device, the number of the connection access points according to the number of the access points, the first data queue and the second algorithm, wherein the second algorithm is:

$$n(t) = \begin{cases} \min(D_t), & \text{if } \left\lceil \dfrac{\ln \dfrac{X(t)}{U(t)}}{\ln(1-p)} \right\rceil < \min(D_t); \\ \left\lceil \dfrac{\ln \dfrac{X(t)}{U(t)}}{\ln(1-p)} \right\rceil, & \text{if } \left\lceil \dfrac{\ln \dfrac{X(t)}{U(t)}}{\ln(1-p)} \right\rceil \in D_t; \\ \max(D_t), & \text{if } \left\lceil \dfrac{\ln \dfrac{X(t)}{U(t)}}{\ln(1-p)} \right\rceil > \max(D_t); \end{cases}$$

wherein $D_t$ is the available number set of the access points at the time t; n(t) is the number of the connection access points at the time t; U(t) is the value of first data queue or the second data queue at the time t; X(t) is a time variable at the time t; and p is a first preset constant.

7. The wireless communication method of claim 1, wherein when it is determined that the electronic device is able to connect to the base station, estimating the number of the connection access points according to the number of the access points and the determination result comprises:

when it is determined to connect the electronic device to the base station, connecting the base station by the electronic device to generate a second data queue, and estimating the number of the connection access points according to the number of the access points, the second data queue and a second algorithm;

when it is determined not to connect the electronic device to the base station, estimating, by the electronic device, the number of the connection access points according to the number of the access points, the first data queue and the second algorithm, wherein the second algorithm is:

$$n(t) = \begin{cases} \min(D_t), & \text{if } \left\lceil \dfrac{\ln\dfrac{X(t)}{U(t)}}{\ln(1-p)} \right\rceil < \min(D_t); \\ \left\lceil \dfrac{\ln\dfrac{X(t)}{U(t)}}{\ln(1-p)} \right\rceil, & \text{if } \left\lceil \dfrac{\ln\dfrac{X(t)}{U(t)}}{\ln(1-p)} \right\rceil \in D_t; \\ \max(D_t), & \text{if } \left\lceil \dfrac{\ln\dfrac{X(t)}{U(t)}}{\ln(1-p)} \right\rceil > \max(D_t); \end{cases}$$

wherein $D_t$ is the available number set of the access points at the time t; n(t) is the number of the connection access points at the time t; U(t) is the value of first data queue or the second data queue at the time t; X(t) is a time variable at the time t; and p is a first preset constant.

8. A wireless communication system, comprising:

a base station; and a plurality of access points configured to transmit beacon signals to an electronic device, wherein the electronic device is configured for estimating a number of the access points according to the beacon signals, and determines whether the electronic device is able to connect to the base station;

wherein when it is determined that the electronic device is unable to connect to the base station, the electronic device is configured for estimating a number of connection access points according to the number of the access points and a first data queue, and transmitting the number of the connection access points to a base band unit; when it is determined that the electronic device is able to connect to the base station, the electronic device is configured for determining whether to connect the electronic device to the base station according to the first data queue, estimating the number of the connection access points according to the number of the access points, the first data queue and a determination result, and transmitting the determination result and the number of the connection access points to the base band unit.

9. The wireless communication system of claim 8, wherein when the base band unit receives the number of the connection access points, the base band unit is used to distribute target access points in the access points to the electronic device according to the number of the connection access points.

10. The wireless communication system of claim 9, wherein when it is determined that the electronic device is unable to connect to the base station, the electronic device is configured for estimating the number of the connection access points according to the number of the access points, the first data queue and a first algorithm, wherein the first algorithm is:

$$n(t) = \begin{cases} \min(D_t), & \text{if } \left\lceil \dfrac{\ln\dfrac{V}{2U(t)p}}{\ln(1-p)} \right\rceil < \min(D_t); \\ \left\lceil \dfrac{\ln\dfrac{V}{2U(t)p}}{\ln(1-p)} \right\rceil, & \text{if } \left\lceil \dfrac{\ln\dfrac{V}{2U(t)p}}{\ln(1-p)} \right\rceil \in D_t; \\ \max(D_t), & \text{if } \left\lceil \dfrac{\ln\dfrac{V}{2U(t)p}}{\ln(1-p)} \right\rceil > \max(D_t); \end{cases}$$

wherein $D_t$ is the available number set of the access points at the time t; n(t) is the number of the connection access points at the time t; U(t) is the value of the first data queue at the time t; p is a first preset constant; and V is a second preset constant.

11. The wireless communication system of claim 8, wherein when it is determined that the electronic device is unable to connect to the base station, the electronic device is configured for estimating the number of the connection access points according to the number of the access points, the first data queue and a first algorithm, wherein the first algorithm is:

$$n(t) = \begin{cases} \min(D_t), & \text{if } \left\lceil \dfrac{\ln\dfrac{V}{2U(t)p}}{\ln(1-p)} \right\rceil < \min(D_t); \\ \left\lceil \dfrac{\ln\dfrac{V}{2U(t)p}}{\ln(1-p)} \right\rceil, & \text{if } \left\lceil \dfrac{\ln\dfrac{V}{2U(t)p}}{\ln(1-p)} \right\rceil \in D_t; \\ \max(D_t), & \text{if } \left\lceil \dfrac{\ln\dfrac{V}{2U(t)p}}{\ln(1-p)} \right\rceil > \max(D_t); \end{cases}$$

wherein $D_t$ is the available number set of the access points at the time t; n(t) is the number of the connection access points at the time t; U(t) is the value of the first data queue at the time t; p is a first preset constant; and V is a second preset constant.

12. The wireless communication system of claim 8, wherein when the base band unit receives the determination result and the number of the connection access points and determines to connect the electronic device to the base station, the base band unit is used for distributing the base station and target access points in the access points to the electronic device according to the determination result and the number of the connection access points; when the base band unit receives the determination result and the number of the connection access points and determines not to connect the electronic device to the base station, the base band unit is configured for distributing target access points from the access points to the electronic device according to the determination result and the number of the connection access points.

13. The wireless communication system of claim 12, wherein when it is determined that the electronic device is able to connect to the base station and it is determined to connect the electronic device to the base station, the electronic device is configured for being connected with the base station to generate a second data queue, and estimating the number of the connection access points according to the number of the access points, the second data queue and a second algorithm; when it is determined that the electronic device is unable to connect to the base station and it is determined not to connect the electronic device to the base station, the electronic device is configured for estimating the number of the connection access points according to the number of the access points, the first data queue and the second algorithm, wherein the second algorithm is:

$$n(t) = \begin{cases} \min(D_t), & \text{if } \left\lceil \dfrac{\ln\dfrac{X(t)}{U(t)}}{\ln(1-p)} \right\rceil < \min(D_t); \\ \left\lceil \dfrac{\ln\dfrac{X(t)}{U(t)}}{\ln(1-p)} \right\rceil, & \text{if } \left\lceil \dfrac{\ln\dfrac{X(t)}{U(t)}}{\ln(1-p)} \right\rceil \in D_t; \\ \max(D_t), & \text{if } \left\lceil \dfrac{\ln\dfrac{X(t)}{U(t)}}{\ln(1-p)} \right\rceil > \max(D_t); \end{cases}$$

wherein $D_t$ is the available number set of the access points at the time t; n(t) is the number of the connection access points at the time t; is U(t) is the value of first data queue or the second data queue at the time t; X(t) is a time variable at the time t; and p is a first preset constant.

14. The wireless communication system of claim 8, wherein when it is determined that the electronic device is able to connect to the base station and it is determined to connect the electronic device to the base station, the electronic device is configured for being connected with the base station to generate a second data queue, and estimating the number of the connection access points according to the number of the access points, the second data queue and a second algorithm; when it is determined that the electronic device is unable to connect to the base station and it is determined not to connect the electronic device to the base station, the electronic device is configured for estimating the number of the connection access points according to the number of the access points, the first data queue and the second algorithm, wherein the second algorithm is:

$$n(t) = \begin{cases} \min(D_t), & \text{if } \left\lceil \dfrac{\ln\dfrac{X(t)}{U(t)}}{\ln(1-p)} \right\rceil < \min(D_t); \\ \left\lceil \dfrac{\ln\dfrac{X(t)}{U(t)}}{\ln(1-p)} \right\rceil, & \text{if } \left\lceil \dfrac{\ln\dfrac{X(t)}{U(t)}}{\ln(1-p)} \right\rceil \in D_t; \\ \max(D_t), & \text{if } \left\lceil \dfrac{\ln\dfrac{X(t)}{U(t)}}{\ln(1-p)} \right\rceil > \max(D_t); \end{cases}$$

wherein $D_t$ is the available number set of the access points at the time t; n(t) is the number of the connection access points at the time t; U(t) is the value of first data queue or the second data queue at the time t; X(t) is a time variable at the time t; and p is a first preset constant.

* * * * *